(12) United States Patent
Lindskov

(10) Patent No.: US 8,843,266 B2
(45) Date of Patent: Sep. 23, 2014

(54) POSITIONING APPARATUS FOR EXCAVATING AND SIMILAR EQUIPMENT

(75) Inventor: Anders Lindskov, Ebberup (DK)

(73) Assignee: Mikrofyn A/S, Odense (DK)

( * ) Notice: Subject to any disclaimer, the term of this patent is extended or adjusted under 35 U.S.C. 154(b) by 0 days.

(21) Appl. No.: 13/639,540

(22) PCT Filed: Apr. 18, 2011

(86) PCT No.: PCT/DK2011/000034
§ 371 (c)(1),
(2), (4) Date: Oct. 18, 2012

(87) PCT Pub. No.: WO2011/131196
PCT Pub. Date: Oct. 27, 2011

(65) Prior Publication Data
US 2013/0197743 A1  Aug. 1, 2013

(30) Foreign Application Priority Data

Apr. 18, 2010 (DK) .......................... PA 2010 00317

(51) Int. Cl.
| | |
|---|---|
| G06F 11/30 | (2006.01) |
| G08B 23/00 | (2006.01) |
| G01S 1/72 | (2006.01) |
| G01S 15/02 | (2006.01) |
| E02F 9/26 | (2006.01) |
| G01S 5/22 | (2006.01) |
| G01S 15/08 | (2006.01) |
| E02F 9/20 | (2006.01) |

(52) U.S. Cl.
CPC .............. *E02F 9/264* (2013.01); *G01S 15/025* (2013.01); *E02F 9/26* (2013.01); *G01S 5/22* (2013.01); *G01S 15/08* (2013.01); *E02F 9/2025* (2013.01)
USPC .......................... 701/34.4; 340/272.2; 367/99

(58) Field of Classification Search
USPC .......................... 701/34.4; 367/99; 340/572.2
See application file for complete search history.

(56) References Cited

U.S. PATENT DOCUMENTS

| | | | |
|---|---|---|---|
| 2,538,000 A | 1/1951 | Hoar et al. | |
| 4,542,652 A | 9/1985 | Reuter et al. | |
| 4,600,356 A * | 7/1986 | Bridges et al. | 414/694 |
| 6,119,579 A | 9/2000 | Pawelski | |
| 6,142,059 A | 11/2000 | Chan et al. | |
| 7,498,946 B2 * | 3/2009 | Forcier et al. | 340/572.2 |

(Continued)

FOREIGN PATENT DOCUMENTS

| | | |
|---|---|---|
| JP | 2001-064992 A | 3/2001 |
| SE | 469136 B | 5/1993 |
| WO | 03088136 A2 | 10/2003 |
| WO | 2010/003636 A1 | 1/2010 |

*Primary Examiner* — Thomas G Black
*Assistant Examiner* — Tyler Paige
(74) *Attorney, Agent, or Firm* — Maschoff Brennan

(57) ABSTRACT

The complex movements performed by the various components carrying a bucket that performs earth moving work are monitored by means of ultrasound devices relating lengths and angles obtained during a calibration step and instant measurements in a processing unit in order to output either a visual indication of the position of the bucket or signals for automatic control of a digging or other earth-moving operation.

12 Claims, 3 Drawing Sheets

(56) References Cited

U.S. PATENT DOCUMENTS

| | | |
|---|---|---|
| 7,953,559 B2* | 5/2011 | Sundermeyer et al. .......... 702/33 |
| 7,984,574 B2* | 7/2011 | Pfohl et al. ...................... 37/348 |
| 8,184,504 B2* | 5/2012 | Altman et al. ................. 367/124 |
| 2002/0194915 A1* | 12/2002 | Abdel-Malek et al. ......... 73/587 |
| 2004/0178002 A1* | 9/2004 | Kay ................................ 175/57 |
| 2006/0124323 A1* | 6/2006 | Glover et al. ..................... 172/2 |
| 2008/0086240 A1* | 4/2008 | Breed ............................... 701/1 |
| 2013/0033963 A1* | 2/2013 | Lindskov ......................... 367/99 |

\* cited by examiner

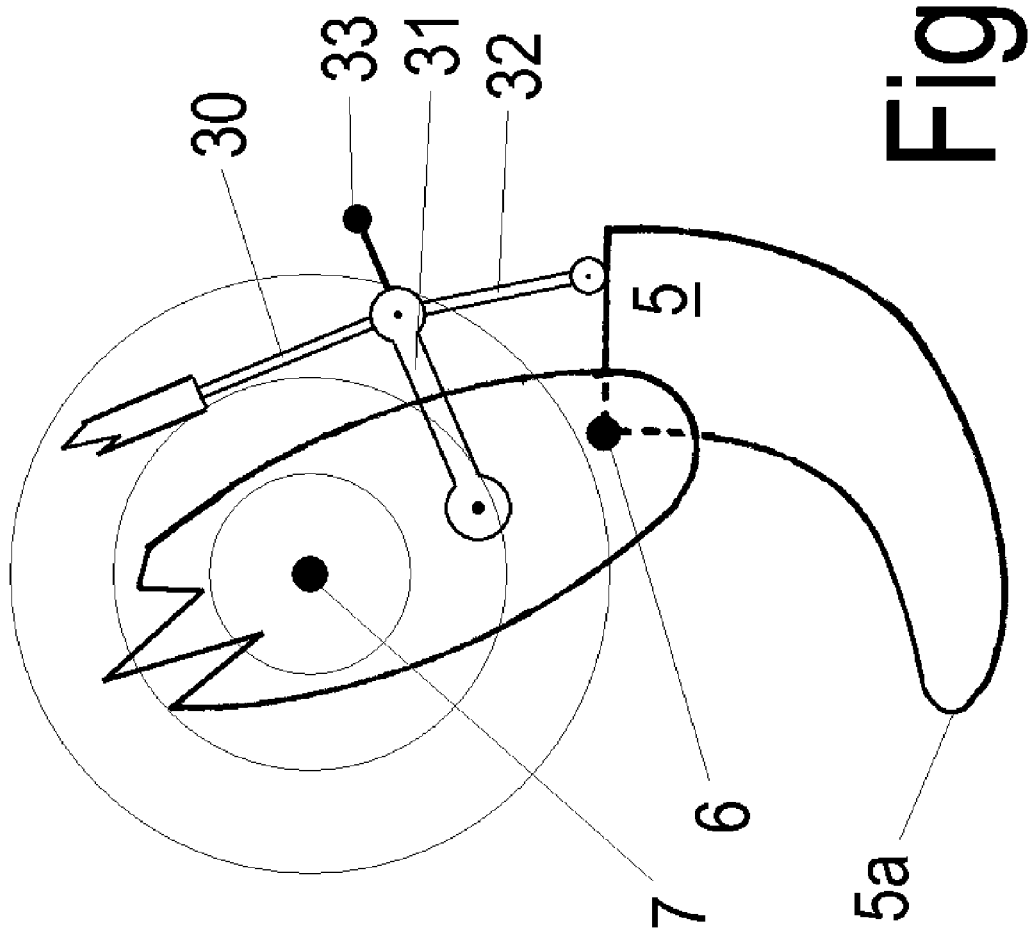

POSITIONING APPARATUS FOR EXCAVATING AND SIMILAR EQUIPMENT

FIELD OF THE INVENTION

The invention relates to apparatus for use in controlling the position and movement of components in excavating and earth moving equipment, said components being moveable in relationship to each other and the ground, said apparatus comprising ultrasound transmitters and receivers mounted on said components.

BACKGROUND

The term "comprising" in the present application is intended to convey the idea of a collection of items that are relevant for the present invention, but it does not exclude that further items may be present and/or relevant. The term "comprising" is not intended to convey the idea of a completeness to the exclusion of other items, which would be better described by the expression "consisting of".

In a backhoe and similar equipment an essential component is a shovel or bucket that is fitted to a stick, the length of which may be changed, and the other end of which is linked to a boom. All movement is usually created by means of hydraulic cylinders. The bucket and its front edge is the interface to the ground that is being modified by the action of the earth moving equipment or contains the earth that is to be moved from one place to the other. The movement of the bucket has to be controlled precisely, frequently with a precision of 0.01 m. The frame of reference is frequently a global grid (GPS) or a local grid, for instance involving rotating laser planes. The depth of the bucket is frequently the most needed measurement. However, it has to be obtained indirectly, from a knowledge of the spatial relationships between the components and from a knowledge of the absolute position of at least one point of one other of these components.

It is impossible to monitor the movement of the front edge of the bucket directly, and instead indirect methods are relied upon. The complexity of the relationships between the various elements in excavating and earth moving equipment is very well illustrated by U.S. Pat. No. 2,538,000, FIGS. 2 and 9. In order to demonstrate the simultaneous movement of several of the moving parts, three trajectories of points on these parts are traced, subdivided in a such a way that equal-numbered subdivisions correspond to simultaneous positions of the various points. The movements are highly non-linear It is, however, possible to calculate geometrically and trigonometrically the position of the edge of the bucket when the angular relationship between all the elements are known, and the length of the stick extension has been taken account of. The angular relationships may be determined directly, by angle encoders on the axes of rotation, and the length of the stick may also be determined directly by linear encoders. Such elements have to be built into the equipment at the time of manufacture, because they are not suitable for retrofitting.

In case of monitoring equipment for retrofitting, angular relationships are frequently obtained indirectly by means of inclination sensors fitted to the various components. The mathematical relationships are used in the processing of the inclination signals obtained and the knowledge about the various distances. Some distances may be measured by means of continuous ultrasound fields, in which an ultrasound transmitter emits a continuous wave, and phase measurements of the signal received by an ultrasound receiver provide the required data. This solution is described for a general application in WO/03088136 A2. In order to provide safety in the movement of the various components of such earth moving equipment, proximity sensors in the form of ultrasound transmitters and receivers ensure that they do not collide, as described in JP2001064992A. A measurement of the extension of a linear ladder is described in WO2010/003636A1, in which an established reference distance is measured by the same ultrasonic elements that measure the extension of the ladder, thereby performing compensation of the influence of temperature and pressure.

Other methods have relied on microwaves or lasers for distance measurements. In particular laser systems are prone to malfunction due to dirt settling on optical surfaces and windows, and due to interruption of line-of-sight between transmitter and receiver.

SUMMARY

The solutions described above do not lend themselves to simple retrofitting and calibration, and the invention aims to provide this. This is obtained in an apparatus that is particular in that the transmitters and receivers are placed on the components of the excavating and earth moving equipment so that their geometrical relationships change dependent on the relative positions of the components, and that at least one ultrasound transmitter is transmitting intermittent bursts of ultrasound energy, and that the ultrasound receivers have a time window of reception after the burst of ultrasound energy, the received signals being transmitted to a processing unit for calculating the position of a predetermined component.

The term "time window" relates to any time-limited enablement to receive ultrasound signals and may for instance be an enablement in the time period, during which an ultrasound signal is expected. In another example, relating to an ultrasound device that may also be used as a receiver, a time window may be opened immediately subsequent to the transmission of a pulse and be kept open until the reception of the first reflected pulse.

An advantageous embodiment is particular in that the components comprise a boom fitted on a tractor body, a stick and a bucket, a wide-angle ultrasound pulse transmitter being placed on said stick close to the stick-bucket joint, said ultrasound pulse transmitter transmitting a pulse that is received by two ultrasound receivers that are placed with a pre-determined distance between them on the tractor body, the arrival times at said receivers being used together with the distance between said receivers in the processing unit to determine by triangulation the position of the stick-bucket joint.

The term "wide-angle" relating to an ultrasonic transmitter or receiver in the present context relates to its radiation characteristics/sensitivity characteristics, sometimes called aperture. Ordinary ultrasound devices have a radiation pattern with a strong lobe in one direction only (narrow-angle). An omni-directional ultrasound device would have a radiation pattern that is a circle. In the present invention a circular radiation pattern would mean loss of radiated power and/or a too large noise component in the received signal. For this reason the radiation pattern is reduced to a wide-angle sector of a circle. A narrow-angle ultrasound device may be converted into a wide-angle device by suitably shaped reflectors placed in the path of the strong radiation lobe.

A further advantageous embodiment is particular in that an inclination sensor is fitted to the tractor body and that a reflector for ultrasonic pulses is fitted to the bucket, and in that the processing unit determines the position relative to ground of the tip of the bucket.

A further advantageous embodiment is particular in that an inclination sensor is fitted to the tractor body and that a reflector for ultrasonic pulses is fitted to a linkage for the rotation of the bucket, and in that the processing unit determines the position relative to ground of the tip of the bucket.

A further advantageous embodiment is particular in that the reflector is an active wide-angle ultrasound device that is capable of switching from a receiving mode to a transmitting mode.

A further advantageous embodiment is particular in that the signal from the ultrasound receivers representing the instant distance between the ultrasound transmitter and an ultrasound receiver is corrected by the velocity of sound determined by means of the transmission time of the roundtrip signal from the transmitter via a reflector back to the transmitter acting as a receiver, in order to obtain a corrected signal representing the position relative to ground of the tip of the bucket.

A further advantageous embodiment is particular in that the signal from the ultrasound receivers representing the instant distance between the ultrasound transmitter and an ultrasound receiver is corrected by the velocity of sound determined by means of signals from temperature and pressure sensors provided to the processing unit, thereby obtaining a corrected signal representing the position relative to ground of the tip of the bucket.

A further advantageous embodiment is particular in that the stick is provided with a stick extension, that the wide-angle ultrasonic transmitter/receiver is fitted to the stick extension, that a further ultrasonic receiver is fitted to the stick and that the transit time from the ultrasonic transmitter/receiver to said receiver is a measure of the instant length of the stick for the purpose of determining the position relative to ground of the tip of the bucket.

A further advantageous embodiment is particular in that the transmission of a signal in response the reception of an ultrasound signal from the transmitter by the receivers as well as the signal from the inclinometer on the tractor body occurs by electromagnetic radiation means, appropriate receivers being provided in conjunction with the processing unit.

A further advantageous embodiment is particular in that the transmission of a signal in response the reception of an ultrasound signal from the transmitter by the receivers as well as the signal from the inclinometer on the tractor body occurs by means of ultrasound signals transmitted from the receivers and inclinometer, the wide-angle receiver receiving all of these signals in a time-staggered fashion.

The ultrasound transmitter transmits a pulse of ultrasound, receivers on the body of the tractor receive the pulse, and the delay between the received pulses and the known distance between the two receivers permit the calculation of primarily the position of the ultrasound transmitter, which for all practical purposes is identical to the position of the stick-bucket joint. By means of an inclinometer mounted on the structure that carries the receivers it is possible to determine an XY position with respect to true horizontal, in other words its elevation.

In order to enhance precision more than one transmitter and more than three receivers may be used in suitable combination. This means that the precision is not linked to large baselines but may be obtained by multiple determinations using smaller components.

The signals to and from the ultrasonic components may be transmitted by means of cables, however the ultrasound transmitter may also be provided with an infrared transmitter that transmits a pulse concurrently with the pulse of ultrasound. The ultrasound receivers are similarly provided with infrared receivers. This creates the burst start time at the receivers, a clock is started and again stopped when the ultrasound pulse arrives, providing a transit time that is proportional to the distance between the ultrasound transmitter and the instant ultrasound receiver.

The processing may also be performed by an assembly containing the wide-angle ultrasound transmitter, in that all ultrasound components are devices of the variety that will perform both as a transmitter and as a receiver. Suitable gating of the signals (opening and closing of various "time windows") ensures this type of operation. The assembly is made to contain all signal processing, and in order to obtain this without undue cabling, the sequence of processing is the following: the wide-angle ultrasound device transmits a pulse, and it is received by the first fixed ultrasound device to encounter the pulse. After a predetermined and precise delay this ultrasound device responds by transmitting a response ultrasound pulse that is received by the wide-angle ultrasound device as a receiver. The first ultrasound pulse is received by the second fixed ultrasound device to encounter the pulse. After a different predetermined and precise delay this ultrasound receiver responds by transmitting a response ultrasound pulse that is received by the wide-angle ultrasound device as a receiver. The assembly hence has all information necessary to perform the triangulation, that is the elapsed time from the first transmitted pulse arrives at the two fixed devices with a known baseline. The assembly may be combined with an inclinometer in order to provide the required information on the stick-bucket joint and its elevation.

BRIEF DESCRIPTION OF THE DRAWINGS

The invention will be further described in the following with reference to the drawings, in which FIG. 3 shows a schematic side view of a detail of a different embodiment of the apparatus.

DETAILED DESCRIPTION

Figure 1:
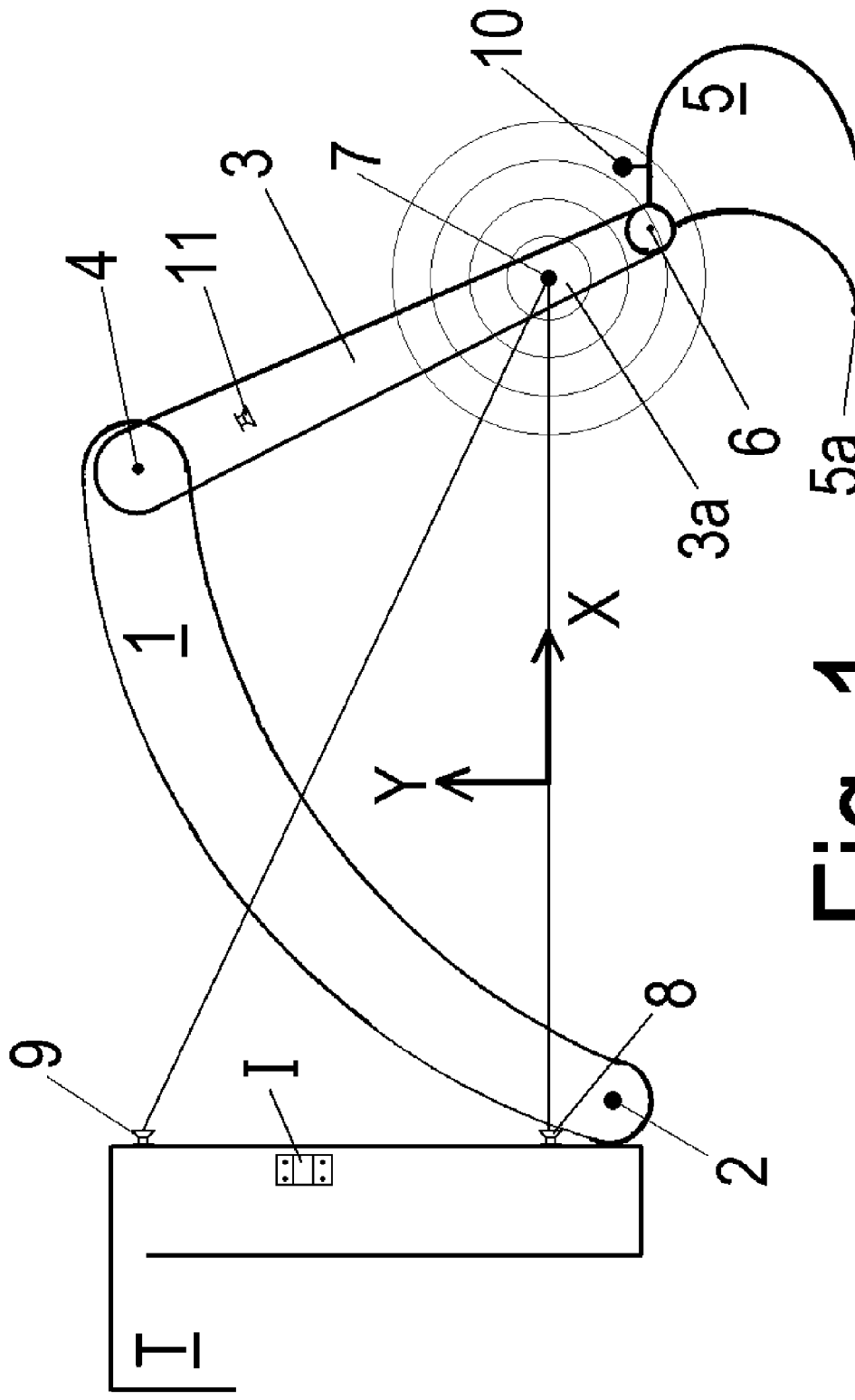
FIG. 1 shows a schematic side view of equipment for a backhoe-type equipment comprising a shovel.

In FIG. 1 is shown part T of a body of a tractor-type vehicle. In the present embodiment an inclinometer I is fitted to the body. On the body T is mounted a boom 1 that is pivotable in a vertical plane around the joint or pivot 2. This plane may be rotated around a vertical axis by providing a further vertical pivot in conjunction with the fitting of the boom to the tractor T. The other end of the boom 1 is connected to a beam, termed a stick 3 by means of the joint or pivot 4. The stick 3 may be extendable. At the other end of the stick 3 a bucket 5 is connected by a pivot or joint 6. The boom 1 and stick 3 are operable by means of hydraulic cylinders that are not shown. The bucket is similarly operable by hydraulic means, and the piston rod 30 of a hydraulic cylinder is shown in FIG. 3.

A wide-angle ultrasound pulse transmitter (which is able to switch electronically to a receiving mode) 7 is fitted to the stick (or stick extension when such is available) at a well-defined distance from the joint 6. A transmitter/receiver that is useful in performing the invention is known as Pepperl+ Fuchs Ultrasonic sensor type UC4000, fitted with a dispersing half-cone. Ultrasound receivers 8 and 9 are fitted on the body T of the tractor with a well-defined distance between them, and the distance of the joint 2 from the ultrasound receivers 8 and 9 is also known. It is quite feasible to use the same type of sensor mentioned above, but without a dispersing cone. It is hence a matter of triangulation to determine the distance of the joint 6 from the body T when the distances 7-9 and 7-2 are known. An element that is reflective to ultrasound is placed at a well-defined location 10 on the bucket 5. A sensor or receiver for ultrasound 11 is fitted to the stick in order to measure the stick extension. The following raw data are generated, taking the emission of an ultrasound pulse from the wide-angle transmitter 7 as a reference in time ("0"). The data is mentioned in the order it is generated if the geometrical relationships of the various elements are as shown in FIG. 1. The fact that several data change when the elements move with respect to each other and the ground is the basis for the calculations that enable precise determinations of the shovel position.

The data that can be obtained according to the invention is:
- transit time from transmitter 7 to bucket reflector 10 and back to transmitter 7 in a receiving mode
- transit time from transmitter 7 to stick sensor 11
- transit time from transmitter 7 to sensor 8 on the body T of the vehicle
- transit time from transmitter 7 to sensor 9 on the body T of the vehicle The transit time data may be transformed into distance data when the temperature and pressure dependent speed of sound is used. The temperature and pressure may be directly measured or a reference distance may be "timed", thereby obtaining a conversion factor. The sensors for temperature and pressure may be fitted to the transmitter/receiver 7 close to the processor.

In a modified embodiment an inclination sensor may be fitted to the bucket 5 in order to provide data relating to its angle with respect to gravity. Modern inclinometers are very sturdy and display sensitivity in one plane only. Only a short cable is required to connect it to the wide-angle transmitter 7 in order to provide power and to transmit data.

Based on the knowledge of the fixed distances between the two sensors 8 and 9 and the distance and angular relationship between the tip 5a of the bucket 5 and the bucket reflector 10 it is now possible to calculate the precise relationship of the tip 5a of the bucket with respect to the body of the vehicle T. Similarly if the inclination of the bucket is obtained by the use of a fitted inclination sensor. If the inclination data from the inclination sensor I is used in conjunction with a precise determination of the height obtained by independent means, an absolute measure of the position of the bucket is obtained.

With two receivers (such as 8 and 9) a two-dimensional determination of the position of the stick-bucket joint can be made. By simply adding a third receiver out of the plane defined by the transmitter and the receivers 8 and 9 a three-dimensional determination may be made by compound triangulation. This would be the case if the plane of the boom 1 and the stick 3 is rotated with respect to the body T of the tractor.

All of these calculations are performed in a processing unit P that is not shown in FIG. 1. Data buses for communication between the devices and the processing unit as well as power supply cables are well-known and may be used in the invention.

In a modified embodiment of the invention the communication between the devices and the processing unit occurs by wireless means, and the processing unit is placed in conjunction with the ultrasound transmitter/receiver 7. This has the advantage that only power supply cables have to be installed. Two variants are preferable in this respect:

a) the data communication between the transmitter/receiver 7 and the other sensors (8, 9, 11) occurs by infrared light (LED) or other electromagnetic radiation (radio signals), which tolerates the presence of dirt and sunlight better than lasers, and b) the data communication occurs by means of ultrasonic pulses of the same type that is used for the distance measurements, but using the sensors (8, 9, 11) as transmitters and suitably coded ultrasonic signals. The inclination sensor I as well as the sensor optionally fitted directly to the bucket 5 (not shown) are supplied with similar transmitter/receiver elements in this embodiment.

In order for the system to be calibrated to the new bucket it is only necessary to place the bucket in a position where the line between the tip 5a of the bucket and the joint 6 is vertical and to measure either the distance between the joint 6 and the tip 5a or the distance between the transmitter/receiver 7 and the tip 5a. Either of these two measurements are entered into the system the first time this bucket is used, and the calculations proceed with different constants.

Figure 2:
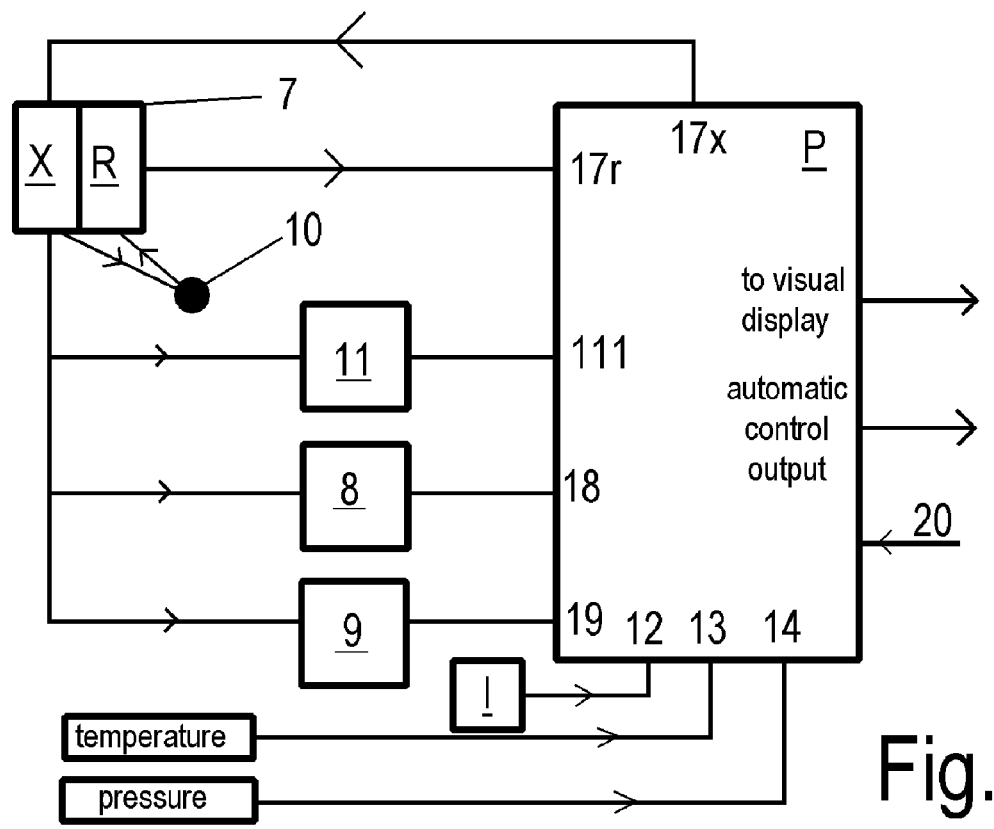
FIG. 2 shows a block diagram of the signal processing path according to one embodiment of the invention.

In FIG. 2 is shown the structure of a processing unit P that makes use of the data created by the sensors and provides a suitable output that corresponds to the real-time operating situation. The processing unit has an input 20 for inputting calibration data relating to the element lengths needed for the calculations, including the calibration for the bucket 5. These data are stored in internal memory as constants. Furthermore, there are inputs from the inclinometer I to the input 12 and from the temperature sensor to the input 13 and the pressure sensor to input 14.

The processing unit P is also a controller for the wide-angle transmitter/receiver 7 (7X, 7R) and enables an ultrasonic pulse signal via the output 17x, thereby defining a time zero for this series of measurements. The reflection of the pulse from the reflector 10 on the bucket 5 is received by the transmitter/receiver 7 switched to reception mode 7R and the corresponding electronic signal is received at the input 17r. Similarly, electronic signals are received at the inputs 111, 18, and 19 when the ultrasound pulse is received at the sensors 11, 8, and 9, respectively.

The structure of the processor is not essentially changed if the transmission of the signals from the sensors occurs by IR; it is only necessary to provide IR receivers to convert the signals into electronic signals suitable for the inputs 12, 111, 18, 19, The processing unit P essentially calculates the unknown position of the tip of the bucket 5a by trigonometric means that are by themselves well-known, and the output may be presented visually as a display of the position in a grid referring to the scene of operation of the operator. This will enable the operator to follow and obtain a desired profile manually by operating the controls of the vehicle and the excavating components fitted to it. However, the output may also be in the form of a stream of data that is useful for automatic operation of the earth moving equipment, ensuring that a particular profile is obtained via position feedback from the tip of the bucket as obtained by calculation.

In FIG. 3 is shown a different embodiment of the invention for use in those cases where it is not expedient to provide an ultrasound reflecting element 10 on the bucket. Such would be the case if the bucket is to be changed for a different bucket in the field. In this case, the reflector 33 is fitted to a lever 31 that is used in rotating the bucket that is fitted. The rotation occurs via a hydraulic cylinder, the piston rod 30 of which is shown. Again in this case, the geometry is not difficult to treat by trigonometric calculations, as long as a new calibration is performed as described above and the data entered via the input 20 for storage as new constants. The reflecting element 33 may be an active wide-angle ultrasound device as described above, and it may also be combined with an inclination sensor for indirect indication of the inclination of the bucket.

Figure 4:
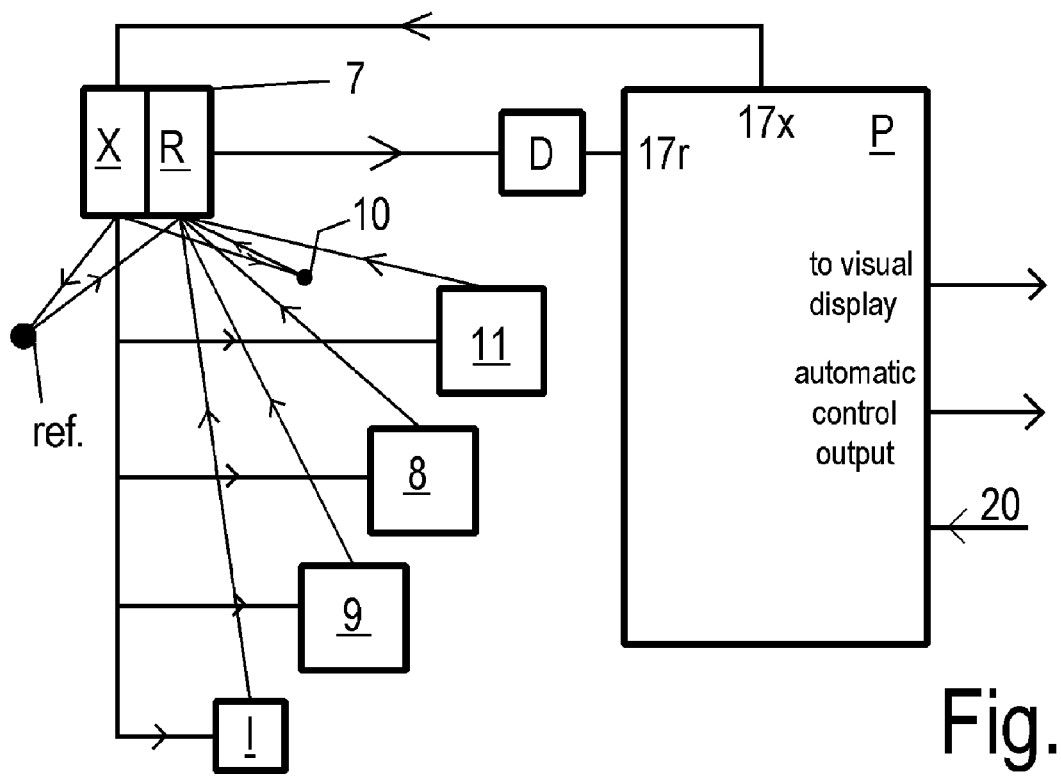
FIG. 4 shows a block diagram of the signal processing path according to another embodiment of the invention.

In FIG. 4 is shown the structure of the signal/data processing that occurs if all sensors are of the transmitter/receiver type. In order to permit the transmitter/receiver 7 to channel all measurement data, they have to be sequenced or multiplexed. This is obtained by providing a fixed and individual delay time in each of the sensors 11; 8; 9; I from the reception of the ultrasound pulse from the transmitter 7X until that particular unit transmits its response back. The passive reflectors 10 (for the bucket angle measurement) and ref (for obtaining a reference length under the same temperature and pressure conditions) obviously have no delay and will provide the first signals to return to the receiver 7R. In order that the processing unit P is enabled to assign the received signals to the correct measurement a demultiplexer D is fitted into the signal path from the receiver 7R. The task of the demultiplexer is to assign a label to each reading obtained and to restructure the data into a form that is useful for the processing unit. The outputs are precisely as described above for the cabled case.

Summing up, the invention relates to monitoring of the complex movements performed by the various components (1, 3, 3a) carrying a bucket (5) that performs earth moving work by means of ultrasound devices (7, 8, 9, 10, 11) relating lengths and angles obtained during a calibration step and instant measurements in a processing unit (P) in order to output either a visual indication of the position of the bucket or signals for automatic control of a digging or other earth-moving operation.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

What is claimed is:

1. An apparatus for use in controlling the position and movement of components in excavating and earth moving equipment, said components being moveable in relationship to each other and the ground, said apparatus comprising:
    ultrasound transmitters and receivers mounted on said components,
    wherein said transmitters and receivers are placed on said components of the excavating and earth moving equipment so that their geometrical relationships change dependent on the relative positions of the components, and that at least one ultrasound transmitter is transmitting intermittent bursts of ultrasound energy, and that the ultrasound receivers have a time window of reception after the burst of ultrasound energy, the received signals being transmitted to a processing unit for calculating the position of a predetermined component.

2. An apparatus according to claim 1, wherein the components comprise a boom fitted on a tractor body, a stick and a bucket, a wide-angle ultrasound pulse transmitter being placed on said stick close to the stick-bucket joint, said ultrasound pulse transmitter transmitting a pulse that is received by two ultrasound receivers that are placed with a pre-determined distance between them on the tractor body, the arrival times at said receivers being used together with the distance between said receivers in the processing unit to determine by triangulation the position of the stick-bucket joint.

3. An apparatus according to claim 2, wherein an inclination sensor is fitted to the tractor body and that a reflector for ultrasonic pulses is fitted to the bucket, and in that the processing unit determines the position relative to ground of the tip of the bucket.

4. An apparatus according to claim 2, wherein an inclination sensor is fitted to the tractor body and that a reflector for ultrasonic pulses is fitted to a linkage for the rotation of the bucket, and in that the processing unit determines the position relative to ground of the tip of the bucket.

5. An apparatus according to claim 3, wherein the reflector is an active wide-angle ultrasound device that is capable of switching from a receiving mode to a transmitting mode.

6. An apparatus according to claim 3, wherein the signal from the ultrasound receivers representing the instant distance between the ultrasound transmitter and an ultrasound receiver is corrected by the velocity of sound determined by means of the transmission time of the roundtrip signal from the transmitter via a reflector back to the transmitter acting as a receiver, in order to obtain a corrected signal representing the position relative to ground of the tip of the bucket.

7. An apparatus according to claim 4, wherein the signal from the ultrasound receivers representing the instant distance between the ultrasound transmitter and an ultrasound receiver is corrected by the velocity of sound determined by means of the transmission time of the roundtrip signal from the transmitter via a reflector back to the transmitter acting as a receiver, in order to obtain a corrected signal representing the position relative to ground of the tip of the bucket.

8. An apparatus according to claim 3, wherein that the signal from the ultrasound receivers representing the instant distance between the ultrasound transmitter and an ultrasound receiver is corrected by the velocity of sound determined by means of signals from temperature and pressure sensors provided to the processing unit, thereby obtaining a corrected signal representing the position relative to ground of the tip of the bucket.

9. An apparatus according to claim 4, wherein that the signal from the ultrasound receivers representing the instant distance between the ultrasound transmitter and an ultrasound receiver is corrected by the velocity of sound determined by means of signals from temperature and pressure sensors provided to the processing unit, thereby obtaining a corrected signal representing the position relative to ground of the tip of the bucket.

10. An apparatus according to claim 3, wherein the stick is provided with a stick extension, that the wide-angle ultrasonic transmitter/receiver is fitted to the stick extension, that a further ultrasonic receiver is fitted to the stick and that the transit time from the ultrasonic transmitter/receiver to said receiver is a measure of the instant length of the stick for the purpose of determining the position relative to ground of the tip of the bucket.

11. An apparatus according to claim 1, wherein the transmission of a signal in response the reception of an ultrasound signal from the transmitter by the receivers as well as the signal from the inclinometer on the tractor body occurs by electromagnetic radiation means, appropriate receivers being provided in conjunction with the processing unit.

12. An apparatus according to any of the claim 2, wherein the transmission of a signal in response the reception of an ultrasound signal from the ultrasound transmitter by the ultrasound receivers as well as the signal from the inclinometer on the tractor body occurs by means of ultrasound signals transmitted from the receivers and inclinometer, the wide-angle ultrasound receiver receiving all of these signals in a time-staggered fashion.

* * * * *